US009512323B2

(12) United States Patent
Uemura (10) Patent No.: US 9,512,323 B2
(45) Date of Patent: Dec. 6, 2016

(54) CONDUCTIVE UNDERCOATING AGENT COMPOSITION

(75) Inventor: Taichi Uemura, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 707 days.

(21) Appl. No.: 13/882,086

(22) PCT Filed: Oct. 21, 2011

(86) PCT No.: PCT/JP2011/074314
§ 371 (c)(1),
(2), (4) Date: Apr. 26, 2013

(87) PCT Pub. No.: WO2012/057031
PCT Pub. Date: May 3, 2012

(65) Prior Publication Data
US 2013/0224587 A1   Aug. 29, 2013

(30) Foreign Application Priority Data

Oct. 27, 2010   (JP) .................................. 2010-240710

(51) Int. Cl.
*C09D 5/24*   (2006.01)
*H01B 1/24*   (2006.01)
*H01G 11/68*   (2013.01)
*H01M 4/66*   (2006.01)

(52) U.S. Cl.
CPC  *C09D 5/24* (2013.01); *H01B 1/24* (2013.01); *H01G 11/68* (2013.01); *H01M 4/663* (2013.01); *H01M 4/667* (2013.01); *Y02E 60/13* (2013.01)

(58) Field of Classification Search
CPC ............. C09D 5/24; H01B 1/24; H01G 11/68; H01M 4/663; H01M 4/667; Y02E 60/13
(Continued)

(56) References Cited

U.S. PATENT DOCUMENTS 5,478,676 A   12/1995  Turi et al.
2009/0140218 A1   6/2009  Inaba et al.
2011/0091771 A1   4/2011  Sannan et al.

FOREIGN PATENT DOCUMENTS

CN   1494090 A   5/2004
JP   63-121265 A   5/1988
(Continued)

OTHER PUBLICATIONS

International Search Report issued in PCT/JP2011/074314 mailed Jan. 24, 2012 (6 pages).
(Continued)

*Primary Examiner* — Mark Kopec
*Assistant Examiner* — Danny N Kang
(74) *Attorney, Agent, or Firm* — Osha • Liang LLP (57) ABSTRACT

A task of the present invention is to solve the problem in that the conductive undercoating agent composition for coating a current collector has so poor electrochemical durability that the conductive undercoating agent composition is peeled off the current collector after a long-term reliability test. A conductive undercoating agent composition for a current collector for a battery or electrical double layer capacitor, which comprises a polymer having a substituent capable of bonding to an active hydrogen group, inorganic particles having an active hydrogen group, and a conductive agent.

11 Claims, 1 Drawing Sheet

(58) Field of Classification Search
USPC .......................................................... 252/500
See application file for complete search history.

(56) References Cited

FOREIGN PATENT DOCUMENTS

| | | | | | |
|---|---|---|---|---|---|
| JP | 07-201362 A | | 8/1995 | | |
| JP | 11-505660 | | 5/1999 | | |
| JP | 11-339771 | | 12/1999 | | |
| JP | 2010-146726 | * | 7/2010 | ............... | H01B 1/20 |
| JP | 2010-146726 A | | 7/2010 | | |
| JP | 2010146726 A | * | 7/2010 | | |
| JP | 2010-238588 A | | 10/2010 | | |
| TW | 200412600 A | | 7/2004 | | |
| TW | 200931453 A | | 7/2009 | | |
| WO | 2009147989 A1 | | 12/2009 | | |

OTHER PUBLICATIONS

Patent Abstracts of Japan for Japanese Publication No. 2010-146726, publication date Jul. 1, 2010 (1 page).
Patent Abstracts of Japan for Japanese Publication No. 11-339771, publication date Dec. 10, 1999 (1 page).
Patent Abstracts of Japan for Japanese Publication No. 2010-238588, publication date Oct. 21, 2010 (1 page).
Patent Abstracts of Japan for Japanese Publication No. 63-121265, publication date May 25, 1988 (1 page).
Patent Abstracts of Japan for Japanese Publication No. 07-201362, publication date Aug. 4, 1995 (1 page).

* cited by examiner

CONDUCTIVE UNDERCOATING AGENT COMPOSITION

FIELD OF THE INVENTION

The present invention relates to a conductive undercoating agent composition for a current collector for a battery, a battery current collector coated with the conductive undercoating agent composition, and a battery comprising the battery current collector. The battery comprising the battery current collector is advantageous not only in that it has a low internal resistance and excellent charge/discharge cycle characteristics as well as large charge/discharge capacity, but also in that even when the battery is charged and discharged in many cycles repeatedly for a long term, the removal of the electrode active material from the battery current collector is unlikely to occur, achieving an increased life of the battery.

BACKGROUND ART

A lithium-ion secondary battery which is lightweight and which has a high voltage and a large capacity, and an electrical double layer capacitor having excellent charge/discharge rate characteristics have been put into practical use as a power source for mobile electric devices, such as a cell phone and a laptop computer. However, in the use of battery as power supply for vehicle and others, which needs to discharge and charge a large current in a short time upon starting and stopping the vehicle and others, the conventional battery has a high internal resistance so that it cannot exhibit practically satisfactory high-rate charge/discharge cycle characteristics. In addition, the conventional battery is unsatisfactory in respect of the charge/discharge capacity from the viewpoint of the running distance, and further unsatisfactory in respect of the adhesion properties between the electrode active material layer and the metal current collector from the viewpoint of the safety.

One of the reasons why the battery cannot exhibit satisfactory properties as mentioned above resides in that the resistance between the battery current collector and the active material layer is high, and in that the adhesion force between the battery current collector and the active material layer is not satisfactory. As a method for solving the above problem, a method has been proposed in which a battery current collector is provided with a conductive coating layer, and an active material layer is formed on the surface of the conductive coating layer to reduce the resistance at the interface between the battery current collector and the active material layer, thus improving the adhesion force between the current collector and the active material layer (patent document 1).

Especially, a conductive coating layer of a type including a polymer compound incorporated as a binder, wherein the polymer compound is crosslinked, has excellent solvent resistance and excellent adhesion properties (patent documents 2, 3, and 4).

However, when the battery obtained by the above methods is used as power supply for vehicle and others, the battery cannot achieve practically satisfactory high-rate charge/discharge cycle characteristics. Particularly, when the battery obtained by the above methods is subjected to long-term charge/discharge cycle test or high-temperature shelf test, the deterioration of the battery characteristics cannot be satisfactorily prevented.

PRIOR ART REFERENCES

Patent Documents

Patent document 1: Japanese Unexamined Patent Publication No. Sho 63-121265
Patent document 2: Japanese Unexamined Patent Publication No. Hei 7-201362
Patent document 3: WO2009/147989 pamphlet
Patent document 4: Japanese Unexamined Patent Publication No. 2010-146726

DISCLOSURE OF THE INVENTION

Problems to be Solved by the Invention

An object of the present invention is to solve the problem accompanying the prior art in that the conductive coating agent for current collector, which is used for increasing the adhesion properties between a battery current collector and an active material layer to improve the battery characteristics, is electrochemically decomposed and peeled off when the battery is charged and discharged for a long term or the charged battery is allowed to stand at a high temperature, causing the battery characteristics to become extremely poor.

Means to Solve the Problems

The present inventor has made studies with a view toward solving the above-mentioned problem accompanying the prior art. As a result, the reason that the battery characteristics deteriorate has been found to reside in that a bonding between the conventional binder and the battery current collector is easily electrochemically cleaved, causing the undercoat layer to be easily peeled off the battery current collector during the charging and discharging.

The present invention is directed to a conductive undercoating agent composition for a current collector for a battery or electrical double layer capacitor, which comprises a polymer having a substituent capable of bonding to an active hydrogen group, inorganic particles having an active hydrogen group, and a conductive agent. By coating a current collector for a battery or electrical double layer capacitor with the conductive undercoating agent composition of the present invention, even when the battery is charged and discharged in many cycles repeatedly for a long term, or the charged battery is allowed to stand at a high temperature, the deterioration of the battery characteristics can be prevented.

Further, the present invention is directed to a current collector for a battery or electrical double layer capacitor coated with the above-mentioned conductive undercoating agent composition for a current collector for a battery or electrical double layer capacitor and a battery comprising the battery or electrical double layer capacitor current collector.

Effect of the Invention

In the conductive undercoating agent composition of the present invention, the active hydrogen group on the surface of the inorganic fine particles, the active hydrogen group present on the surface of a current collector for a battery or electrical double layer capacitor, and the polymer having a substituent capable of bonding to an active hydrogen group are bonded together. Therefore, the conductive undercoating agent composition has an advantage in that the adhesion force of the composition to the current collector for a battery or electrical double layer capacitor is high and the inorganic-inorganic bonding between the active hydrogen group on the surface of the inorganic fine particles and the active hydrogen group on the surface of the current collector is unlikely to suffer electrochemical cleavage, enabling the formation of an electrochemically stable coating layer.

In the present invention, further, the adhesion force is stronger than that of a conventional conductive coating layer and therefore an electrically conductive chipping is unlikely to form when slitting the electrode, making it possible to prevent an accident caused due to short-circuiting during the use.

BEST MODE FOR CARRYING OUT THE INVENTION

Figure 1:
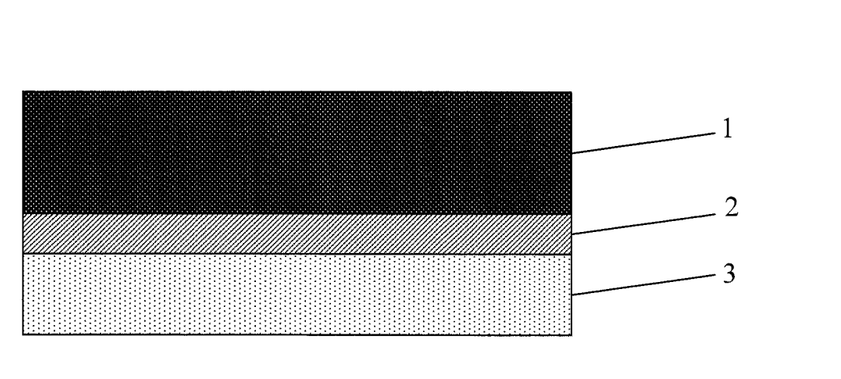
FIG. 1 is a cross-sectional view of a battery electrode comprising a battery current collector coated with the conductive undercoating agent composition for a battery current collector, and an active material layer.

The conductive undercoating agent composition for a battery current collector of the present invention comprises a polymer having a substituent capable of bonding to an active hydrogen group, inorganic particles having an active hydrogen group, and a conductive agent.

[Polymer Compound Having a Substituent Capable of Bonding to an Active Hydrogen Group]

In the present invention, the polymer having a substituent capable of bonding to an active hydrogen group is a polymer compound having in the molecule thereof a substituent capable of bonding to an active hydrogen group. The substituent capable of bonding to an active hydrogen group means a substituent which is capable of causing dipole interaction or forming a hydrogen bond together with an active hydrogen group of the inorganic particles, or which is capable of causing a chemical reaction together with an active hydrogen group of the inorganic particles to form a covalent bond. Specific examples of the substituents capable of causing dipole interaction or forming a hydrogen bond together with an active hydrogen group include a hydroxy group (—OH), a carboxyl group (—COOH), an amino group (—$NH_2$, —$NHR^1$), a hydrazide group ($R^1R^2NN(R^3)C(=O)R^4$), a hydroxylamino group (—NHOH), a sulfo group (—$SO_3H$), a thiol group (—SH), and a silanol group (—$SiOHR^1R^2$), wherein, in the above formulae, each of $R^1$ to $R^4$ represents a hydrogen atom, a $C_1$-$C_8$ alkyl group, a hydroxyl group, an acyl group, a carboxyl group, an amino group, a vinyl group, an allyl group, an aryl group, a halogen, or a metal, and active hydrogen groups can together cause dipole interaction or form a hydrogen bond. Examples of the substituents capable of causing a reaction together with an active hydrogen group of the inorganic particles to form a covalent bond include oxirane rings, such as an epoxy group and an oxetanyl group, an episulfide group, an ethyleneimine, an ester group which crosslinks due to a transesterification reaction, an alkoxysilane, metal alkoxides, and metal chelates, but the substituent is not limited to these groups.

Specific examples of polymers having a substituent capable of bonding to an active hydrogen group include completely saponified polyvinyl alcohol (such as KURARAY POVAL PVA-124, manufactured by Kuraray Co., Ltd.; and JC-25, manufactured by Japan Vam & Poval Co., Ltd.), partially saponified polyvinyl alcohol (such as KURARAY POVAL PVA-235, manufactured by Kuraray Co., Ltd.; and JP-33, manufactured by Japan Vam & Poval Co., Ltd.), modified polyvinyl alcohol (such as KURARAY K POLYMER KL-118, KURARAY C POLYMER CM-318, KURARAY R POLYMER R-1130, KURARAY LM POLYMER LM-10HD, manufactured by Kuraray Co., Ltd.; D Polymer DF-20, Anionic modified PVA AF-17, manufactured by Japan Vam & Poval Co., Ltd.; and Cyanoresin CR—S, manufactured by Shin-Etsu Chemical Co., Ltd.), carboxymethyl cellulose (such as H-CMC, DN-100L, 1120, 2200, manufactured by Daicel Chemical Industries, Ltd.; and MAC200HC, manufactured by Nippon Paper Chemicals Co., Ltd.), hydroxyethyl cellulose (such as SP-400, manufactured by Daicel Chemical Industries, Ltd.), polyacrylamide (ACCOFLOC A-102, manufactured by MT AquaPolymer, Inc.), an epoxy resin (such as EX-614, manufactured by Nagase ChemteX Corporation; and EPIKOTE 5003-W55, manufactured by Japan Chemtech Ltd.), episulfide (such as YL7000, manufactured by Japan Epoxy Resins Co., Ltd.), polyethyleneimine (EPOMIN P-1000, manufactured by Nippon Shokubai Co., Ltd.), polyacrylate (such as ACCOFLOC C-502, manufactured by MT AquaPolymer, Inc.), saccharides and derivatives thereof (Chitosan 5, manufactured by Wako Pure Chemical Industries, Ltd.; Esterified Starch Amycol, manufactured by Nippon Starch Chemical Co., Ltd.), polystyrenesulfonic acid (Poly-NaSS PS-100, manufactured by Tosoh Organic Chemical Co., Ltd.), and methyldimethoxysilyl group-terminal polypropylene oxide (Kaneka Silyl SAT200, manufactured by Kaneka Corporation).

As a further example of the substituent capable of bonding to an active hydrogen group in the present invention, there can be mentioned a silyl group (—$SiR^{11}R^{12}R^{13}$) {wherein each of $R^{11}$ to $R^{13}$ independently represents a group selected from the group consisting of a $C_1$-$C_6$ alkyl group and a halogen group, with the proviso that at least one of $R^{11}$ to $R^{13}$ is —$OR^{14}$ (wherein $R^{14}$ is a group selected from the group consisting of H, a $C_1$-$C_6$ alkyl group, and a group derived from a cation capable of constituting an electrolyte for a battery or electrical double layer capacitor)}. Examples of the polymers having a silyl group in the present invention include a compound obtained by substituting the above-mentioned water-soluble polymer with a silyl group (for example, a silyl group-modified polyvinyl alcohol), and a reaction product of a substituent capable of reacting with an active hydrogen group in the above-mentioned water-soluble polymer {an epoxy group (KBM-403, manufactured by Shin-Etsu Chemical Co., Ltd.), a carboxylic anhydride {3-(trimethoxysilyl)propylsuccinic anhydride}, an isocyanate group (KBE 9007, manufactured by Shin-Etsu Chemical Co., Ltd.)} and the compound having a silyl group.

[Inorganic Particles Having an Active Hydrogen Group]

In the present invention, with respect to the inorganic particles having an active hydrogen group, various types of known inorganic particles can be used, and examples include silica, kaolin, mullite, titania, tin oxide, boehmite, γ-alumina, α-alumina, beryllia, iron hydroxide $Fe(OH)_2$, manganese hydroxide, magnesium hydroxide, silicon nitride, aluminum nitride, zirconia, hydroxyapatite, barium titanate, strontium carbonate, fluorite, ferrite, and zinc oxide. These inorganic particles preferably have an isoelectric point close to the isoelectric point of the active hydrogen group present on the surface of a battery current collector to which the conductive undercoating agent composition is applied. For example, with respect to aluminum generally used in the current collector of a lithium-ion secondary battery or the current collector of an electrical double layer capacitor, it is preferred to use inorganic particles having a pH for isoelectric point close to 7.7 to 9.1 which is the pH for isoelectric point of alumina corresponding to an oxide of aluminum or boehmite corresponding to a hydroxide of aluminum. The inorganic particles preferably have a pH for isoelectric point in the range of from 1.8 to 14, further preferably in the range of from 4.5 to 14, further preferably in the range of from 6 to 11, especially preferably in the range of from 7 to 10. Examples of pH for isoelectric point of various types of inorganic particles include silica (pH: about 1.8), kaolin (pH: about 5.1), mullite (pH: about 6.3), titania; anatase (pH: about 6.2), tin oxide (pH: about 6.9), boehmite (pH: about 7.7), γ-alumina (pH: about 7.9), α-alumina (pH: about 9.1), beryllia (pH: about 10.1), iron hydroxide $Fe(OH)_2$ (pH: about 12.0), manganese hydroxide (pH: about 12.0), and magnesium hydroxide (pH: about 12.4). With respect to the isoelectric point, a value as measured by the method described in JIS R1638 "Method for measuring an isoelectric point of fine ceramic powder" can be used. One type of the inorganic particles can be used or two or more types of the inorganic particles can be used in combination, and preferred are those which are dried at a temperature as high as about 200° C. for one hour in order to activate the active hydrogen group on the surface of the particles. The inorganic particles may be used either in the form of a powder or in the form of a water-dispersed colloid, such as a silica sol or an aluminum sol. The amount of the active hydrogen group on the surface of the particles is directly proportional to the specific surface area of the particles, and therefore the size of the particles is advantageously smaller, preferably in the range of from 0.001 to 1 μm, further preferably in the range of from 0.005 to 0.5 μm. Further, for preventing the electric conduction from being hindered by the contact with the conductive agent, the size of the inorganic particles is advantageously smaller than the size of particles of the conductive agent or the size of coagulated particles caused due to secondary coagulation of the conductive agent.

The conductive undercoating agent composition of the present invention contains, relative to 100 parts by weight of the polymer compound, preferably 0.1 to 1,000 parts by weight, more preferably 1 to 200 parts by weight, especially preferably 5 to 100 parts by weight of the inorganic particles having an active hydrogen group.

[Conductive Agent]

The conductive agent in the present invention can be conductive particles or filler, or a liquid having ionic properties.

Examples of conductive particles or conducting fillers include powders, flakes, and colloids of a metal, such as Ag, Cu, Au, Al, Mg, Rh, W, Mo, Co, Ni, Pt, Pd, Cr, Ta, Pb, V, Zr, Ti, In, Fe, or Zn; powders and flakes of an alloy, such as Sn—Pb, Sn—In, Sn—Bi, Sn—Ag, or Sn—Zn; carbon black, such as acetylene black, furnace black, and channel black, and conductive carbon materials, such as graphite, graphite fibers, graphite fibrils, carbon fibers, activated carbon, charcoal, carbon nanotubes, and fullerene; and metal oxide conductive fillers which exhibit electric conductivity due to excess electrons formed by the presence of lattice defects, such as zinc oxide, tin oxide, indium oxide, and titanium oxides (titanium dioxide and titanium monoxide). These conductive particles or fillers can be used individually or in combination, and further those having the surfaces treated with, e.g., a coupling agent are preferably used. The size of the particles is preferably in the range of from 0.001 to 100 μm from the viewpoint of the electric conductivity and liquid properties, further preferably in the range of from 0.01 to 10 μm. For forming an uneven surface in the conductive coating layer to increase the adhesion properties of the coating layer to the active material layer by an anchor effect, the conductive particles having a size larger than the above-mentioned range can be used. In such a case, the larger conductive particles can be combined in an amount of 1 to 50% by weight, more preferably 5 to 10% by weight, based on the weight of the conductive agent having a size in the above-mentioned range. As such conductive particles, for example, carbon fibers (Raheama R-A101, manufactured by Teijin Limited; fiber diameter: 8 μm; fiber length: 30 μm) can be used.

The liquid having ionic properties can be a liquid having ions dissolved therein or an ionic liquid. With respect to the liquid having ions dissolved therein, when the solvent is water, examples of ions include sodium chloride, potassium chloride, and lithium chloride, and, when the solvent is an organic material, such as dimethyl carbonate, examples of ions include lithium hexafluorophosphate. Examples of ionic liquids include imidazolium salt derivatives, such as 1,3-dimethylimidazolium methyl sulfate, 1-ethyl-3-methylimidazolium bis(pentafluoroethylsulfonyl)imide, and 1-ethyl-3-methylimidazolium bromide; pyridinium salt derivatives, such as 3-methyl-1-propylpyridinium bis(trifluoromethylsulfonyl)imide and 1-butyl-3-methylpyridinium bis(trifluoromethylsulfonyl)imide; alkylammonium derivatives, such as tetrabutylammonium heptadecafluorooctanesulfonate and tetraphenylammonium methanesulfonate; and phosphonium salt derivatives, such as tetrabutylphosphonium methanesulfonate. These liquids having ionic properties can be used in combination with conductive particles.

The conductive undercoating agent composition of the present invention contains, relative to 100 parts by weight of the polymer compound, preferably 1 to 10,000 parts by weight, more preferably 10 to 9,000 parts by weight, especially preferably 20 to 8,000 parts by weight of the conductive agent.

In the conductive undercoating agent composition for a battery current collector of the present invention, the incorporated component containing the polymer having a substituent capable of bonding to an active hydrogen group present on the surface of the current collector metal and the inorganic particles having an active hydrogen group is used as a binder and therefore exhibits high adhesion force, and further the polymer is bonded to the current collector metal through the inorganic particles, and hence the composition is unlikely to suffer electrochemical decomposition.

(Coupling Agent)

The conductive undercoating agent composition of the present invention can further comprise a coupling agent, such as a silane coupling agent or a titanium coupling agent. With respect to the coupling agent, specific examples include fluorine silane coupling agents, such as (tridecafluoro-1,1,2,2-tetrahydrooctyl)triethoxysilane; epoxy-modified silane coupling agents, such as a coupling agent manufactured by Shin-Etsu Chemical Co., Ltd. (trade name: KBM-403); oxetane-modified silane coupling agents, such as a coupling agent manufactured by Toagosei Co., Ltd. (trade name: TESOX); silane coupling agents, such as vinyltrimethoxysilane, vinyltriethoxysilane, γ-chloropropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, β-glycidoxypropylmethyldimethoxysilane, γ-methacryloyloxypropyltrimethoxysilane, γ-methacryloyloxypropylmethyldimethoxysilane, and γ-mercaptopropyltrimethoxysilane; and titanium coupling agents, such as triethanolamine titanate, titanium acetylacetonate, titanium ethylacetoacetate, titanium lactate, titanium lactate ammonium salt, tetrastearyl titanate, isopropyltricumylphenyl titanate, isopropyltri(N-aminoethyl-aminoethyl)titanate, dicumylphenyl oxyacetate titanate, isopropyltrioctanoyl titanate, isopropyldimethacrylisostearoyl titanate, titanium lactate ethyl ester, octylene glycol titanate, isopropyltriisostearoyl titanate, triisostearylisopropyl titanate, isopropyltridodecylbenzenesulfonyl titanate, tetra(2-ethylhexyl)titanate, butyl titanate dimer, isopropylisostearoyldiacryl titanate, isopropyltri(dioctyl phosphate) titanate, isopropyltris(dioctyl pyrophosphate) titanate, tetraisopropylbis(dioctyl phosphite) titanate, tetraoctylbis(ditridecyl phosphite) titanate, tetra(2,2-diallyloxymethyl-1-butyl)bis(di-tridecyl)phosphite titanate, bis(dioctyl pyrophosphate)oxyacetate titanate, bis(dioctyl pyrophosphate) ethylene titanate, tetra-1-propyl titanate, tetra-n-butyl titanate, and diisostearoyl ethylene titanate. These compounds can be used individually or in combination. The coupling agent is preferably a titanium coupling agent or a silane coupling agent. The titanium coupling agent can be more preferably applied to the inorganic particles having a pH for isoelectric point of 7 or more, and the silane coupling agent can be more preferably applied to the inorganic particles having a pH for isoelectric point of less than 7. By incorporating the coupling agent into the conductive undercoating agent composition for a battery current collector or by using the coupling agent for surface treatment of the particles having an active hydrogen group, the coupling agent can be reacted with the substituent capable of bonding to active hydrogen contained in the conductive undercoating agent composition to further improve the crosslink density, making it possible to further suppress a mutual replacement reaction between elements constituting the active material and elements constituting the current collector. Particularly, a crosslinking reaction to the active hydrogen group caused due to the titanium coupling agent or silane coupling agent makes it possible to improve the crosslinking rate or improve the adhesion force to the battery current collector, strength, or electrochemical resistance.

The conductive undercoating agent composition of the present invention contains, relative to 100 parts by weight of the inorganic particles, preferably 0.001 to 10 parts by weight, especially preferably 0.01 to 5 parts by weight of the coupling agent. The coupling agent is reacted with the active hydrogen group on the surface of the inorganic particles, but, when all the active hydrogen groups of the inorganic particles are consumed, the inorganic particles cannot be bonded to the polymer compound or the active hydrogen group on the surface of the battery current collector, and therefore it is necessary that the amount of the coupling agent added be less than an amount such that the coupling agent is reacted with all the active hydrogen groups of the inorganic particles. The optimum amount of the coupling agent added to the composition can be determined as follows. The inorganic particles are dispersed in a mixture comprising 90% of methanol and 10% of water, and an arbitrary amount of a coupling agent is added to the resultant dispersion to effect a reaction. Then, the particles are removed from the dispersion, and the resultant mixture is subjected to analysis by gas chromatography, and, from the detected free coupling agent amount, the amount of the coupling agent reacted with 100% of the inorganic particles is determined, and the optimum amount of the coupling agent added to the composition can be determined from this amount.

The conductive undercoating agent composition of the present invention preferably contains various types of solvents or stabilizers.

(Solvent)

The conductive undercoating agent composition of the present invention can contain various types of solvents for adjusting the liquid properties. Examples of solvents include hydrocarbons (such as propane, n-butane, n-pentane, isohexane, cyclohexane, n-octane, isooctane, benzene, toluene, xylene, ethylbenzene, amylbenzene, turpentine oil, and pinene), halogenated hydrocarbons (such as methyl chloride, chloroform, carbon tetrachloride, ethylene chloride, methyl bromide, ethyl bromide, chlorobenzene, chlorobromomethane, bromobenzene, fluorodichloromethane, dichlorodifluoromethane, and difluorochloroethane), alcohols (such as methanol, ethanol, n-propanol, isopropanol, n-amyl alcohol, isoamyl alcohol, n-hexanol, n-heptanol, 2-octanol, n-dodecanol, nonanol, cyclohexanol, and glycidol), ethers and acetals (such as ethyl ether, dichloroethyl ether, isopropyl ether, n-butyl ether, diisoamyl ether, methyl phenyl ether, ethyl benzyl ether, furan, furfural, 2-methylfuran, cineol, and methylal), ketones (such as acetone, methyl ethyl ketone, methyl n-propyl ketone, methyl n-amyl ketone, diisobutyl ketone, phorone, isophorone, cyclohexanone, and acetophenone), esters (such as methyl formate, ethyl formate, propyl formate, methyl acetate, ethyl acetate, propyl acetate, n-amyl acetate, methylcyclohexyl acetate, methyl butyrate, ethyl butyrate, propyl butyrate, and butyl stearate), polyhydric alcohols and derivatives thereof (such as ethylene glycol, ethylene glycol monomethyl ether, ethylene glycol monomethyl ether acetate, ethylene glycol monoethyl ether, methoxymethoxyethanol, ethylene glycol monoacetate, diethylene glycol, diethylene glycol monomethyl ether, propylene glycol, and propylene glycol monoethyl ether), fatty acids and phenols (such as formic acid, acetic acid, acetic anhydride, propionic acid, propionic anhydride, butyric acid, isovaleric acid, phenol, cresol, o-cresol, and xylenol), nitrogen compounds (such as nitromethane, nitroethane, 1-nitropropane, nitrobenzene, monomethylamine, dimethylamine, trimethylamine, monoethylamine, diamylamine, aniline, monomethylaniline, o-toluidine, o-chloroaniline, cyclohexylamine, dicyclohexylamine, monoethanolamine, formamide, N,N-dimethylformamide, acetamide, acetonitrile, pyridine, α-picoline, 2,4-lutidine, quinoline, and morpholine), sulfur, phosphorus and other compounds (such as carbon disulfide, dimethyl sulfoxide, 4,4-diethyl-1,2-dithiolane, dimethyl sulfide, dimethyl disulfide, methanethiol, propane sultone, triethyl phosphate, triphenyl phosphate, diethyl carbonate, ethylene carbonate, and amyl borate), inorganic solvents (such as liquid ammonia and silicone oil), and liquids, such as water.

In the conductive undercoating agent composition of the present invention, according to the coating apparatus, the solvent can be added in an arbitrary ratio for adjusting the viscosity of the composition, and, from the viewpoint of coating properties, the composition preferably has a viscosity of 1 to 10,000 mPa·s, more preferably a viscosity of 10 to 1,000 mPa·s, especially preferably a viscosity of 100 to 500 mPa·s.

(Stabilizer)

The conductive undercoating agent composition of the present invention can further contain, if necessary, a stabilizer appropriately selected. Specific examples of stabilizers include phenolic antioxidants, such as 2,6-di-tert-butylphenol, 2,4-di-tert-butylphenol, 2,6-di-tert-butyl-4-ethylphenol, and 2,4-bis-(n-octylthio)-6-(4-hydroxy-3,5-di-tert-butylanilino)-1,3,5-triazine; aromatic amine antioxidants, such as an alkyldiphenylamine, N,N'-diphenyl-p-phenylenediamine, 6-ethoxy-2,2,4-trimethyl-1,2-dihydroquinoline, and N-phenyl-N'-isopropyl-p-phenylenediamine; sulfide hydroperoxide decomposers, such as dilauryl 3,3'-thiodipropionate, ditridecyl 3,3'-thiodipropionate, bis[2-methyl-4-{3-n-alkylthiopropionyloxy}-5-tert-butylphenyl]sulfide, and 2-mercapto-5-methylbenzimidazole; phosphorus hydroperoxide decomposers, such as tris(isodecyl) phosphite, phenyldiisooctyl phosphite, diphenylisooctyl phosphite, di(nonylphenyl)pentaerythritol diphosphite, 3,5-di-tert-butyl-4-hydroxybenzyl phosphate diethyl ester, and sodium bis(4-tert-butylphenyl) phosphate; salicylate light stabilizers, such as phenyl salicylate and 4-tert-octylphenyl salicylate; benzophenone light stabilizers, such as 2,4-dihydroxybenzophenone and 2-hydroxy-4-methoxybenzophenone-5-sulfonic acid; benzotriazole light stabilizers, such as 2-(2'-hydroxy-5'-methylphenyl)benzotriazole and 2,2'-methylenebis[4-(1, 1,3,3-tetramethylbutyl)-6-(2N-benzotriazol-2-yl)phenol]; hindered amine light stabilizers, such as phenyl-4-piperidinyl carbonate and bis-[2,2,6,6-tetramethyl-4-piperidinyl]sebacate; Ni light stabilizers, such as [2,2'-thio-bis(4-t-octylphenolato)]-2-ethylhexylamine-nickel-(II); cyanoacrylate light stabilizers; and oxalic anilide light stabilizers. These compounds can be used individually or in combination.

The conductive undercoating agent composition of the present invention contains, relative to 100 parts by weight of the polymer having a substituent capable of bonding to an active hydrogen group, preferably 0.01 to 10 parts by weight, more preferably 0.05 to 5 parts by weight, especially preferably 0.1 to 1 part by weight of the stabilizer.

(Surfactant)

The conductive undercoating agent composition of the present invention can contain various surfactants for adjusting the wetting properties. With respect to the surfactant, examples of anionic surfactants include a soap, lauryl sulfate, a polyoxyethylene alkyl ether sulfate, an alkylbenzenesulfonate, a polyoxyethylene alkyl ether phosphate, a polyoxyethylene alkyl phenyl ether phosphate, an N-acylamino acid salt, an α-olefinsulfonate, an alkyl sulfate salt, an alkyl phenyl ether sulfate salt, and a methyltaurine salt, and, as counter cations, sodium ions or lithium ions can be used. In a lithium-ion secondary battery, more preferred are those of a lithium ion type. Examples of amphoteric surfactants include an alkyldiaminoethylglycine hydrochloride, a 2-alkyl-N-carboxymethyl-N-hydroxyethylimidazolium betaine, betaine lauryldimethylaminoacetate, coconut oil fatty acid amide propylbetaine, fatty acid alkylbetaine, sulfobetaine, and amine oxide, and examples of nonionic surfactants include alkyl ester compounds of polyethylene glycol, alkyl ether compounds, such as triethylene glycol monobutyl ether, ester compounds, such as polyoxysorbitan ester, alkylphenol compounds, fluorine compounds, and silicone compounds. These compounds can be used individually or in combination.

The conductive undercoating agent composition of the present invention contains, relative to 100 parts by weight of the polymer having a substituent capable of bonding to an active hydrogen group, preferably 0.01 to 50 parts by weight, more preferably 0.1 to 20 parts by weight, especially preferably 1 to 10 parts by weight of the surfactant.

(Organic Particles)

The conductive undercoating agent composition of the present invention can further contain organic particles. The conductive undercoating agent composition of the present invention can be increased in ionic conductivity by imparting flexibility to the film or impregnating the organic particles with an electrolytic solution. Examples of such organic particles include fine particles of a rubber, such as a styrene-butadiene or nitrile rubber, acrylic particles, urethane particles, polypropylene particles, polyethylene particles, and Teflon (registered trademark) particles. These particles can be used individually or in combination, and can be added in the form of an emulsion.

The conductive undercoating agent composition of the present invention contains, relative to 100 parts by weight of the polymer having a substituent capable of bonding to an active hydrogen group, preferably 0.01 to 100 parts by weight, more preferably 0.5 to 80 parts by weight, especially preferably 1 to 50 parts by weight of the organic particles.

(Curing Agent)

In the conductive undercoating agent composition of the present invention, a curing agent can be further incorporated to improve the film in strength or improve the film or interface in resistance to electrolysis. As the curing agent, an acid, such as a polycarboxylic acid or a polysulfonic acid, can be used, and specific examples of curing agents include citric acid, butanetetracarboxylic acid, 3,3',4,4'-biphenyltetracarboxylic acid, hexahydrophthalic acid, 1,3,3a,4,5,9b-hexahydro-5(tetrahydro-2,5-dioxo-3-furanyl)naphtho[1,2-c]furan-1,3-dione (acid anhydride), glycerol bisanhydrotrimellitate monoacetate (acid anhydride), 3,3',4,4'-diphenyl sulfone tetracarboxylic acid, ethylene glycol bisanhydrotrimellitate (acid anhydride), 3,3',4,4'-diphenyl sulfone tetracarboxylic acid, ethylene glycol bisanhydrotrimellitate, methylbicyclo[2.2.1]heptane-2,3-dicarboxylic acid, bicyclo[2.2.1]heptane-2,3-dicarboxylic acid, aspartic acid, pyromellitic acid, mellitic acid, a phosphate group-containing tetracarboxylic acid, phenylethynylphthalic acid, and oxydiphthalic acid. Of these, an aromatic carboxylic acid is preferred from the viewpoint of the reactivity, and one which is substituted with 3 or more carboxylic acids per molecule is preferred from the viewpoint of the reactivity and crosslink density. Further, the anhydride of the above-mentioned polycarboxylic acid can be used.

The conductive undercoating agent of the present invention contains, relative to 100 parts by weight of the polymer having a substituent capable of bonding to an active hydrogen group, preferably 1 to 300 parts by weight, more preferably 10 to 200 parts by weight, especially preferably 20 to 100 parts by weight of the curing agent.

[Preparation of the Conductive Undercoating Agent Composition]

The conductive undercoating agent composition of the present invention can be obtained in the form of, e.g., a solution or a suspension by mixing together the above-mentioned components and stirring the resultant mixture. The stirring can be made by appropriately selecting a stirring apparatus, such as a propeller mixer, a planetary mixer, a hybrid mixer, a kneader, an emulsifying homogenizer, or an ultrasonic homogenizer. Further, the stirring can be made while heating or cooling if necessary.

[Current Collector]

The present invention is directed to a current collector for a battery or electrical double layer capacitor coated with the above-mentioned conductive undercoating agent composition for a current collector for a battery or electrical double layer capacitor.

The current collector coated with the conductive undercoating agent composition of the present invention can be produced by coating a current collector for a battery or electrical double layer capacitor with the conductive undercoating agent composition which is prepared using the above-mentioned materials. Examples of battery or electrical double layer capacitor current collectors include metals, such as gold, silver, copper, aluminum, nickel, iron, and cobalt, carbon fiber nonwoven fabric, and composite materials having electric conductivity, such as a metal composite material. In a lithium-ion secondary battery, an aluminum foil for positive electrode and a copper foil for negative electrode are used, and, in an electrical double layer capacitor, an aluminum foil or an aluminum etched foil is used. Coating can be made using a gravure coater, a slit die coater, a spray coater, or dipping. The thickness of the coating layer is preferably in the range of from 0.01 to 100 μm, further preferably in the range of from 0.05 to 5 μm from the viewpoint of electrical properties and adhesion properties. When the coating layer has too small a thickness, the opportunity or area for the contact between the conductive agent and the battery current collector is reduced, so that the resistance cannot be reduced. Conversely, when the coating layer has too large a thickness, the resistance is proportionally increased according to the thickness, and thus the resistance cannot be reduced.

[Battery or Electrical Double Layer Capacitor]

The present invention is directed to a battery or electrical double layer capacitor comprising the above-mentioned current collector for a battery or electrical double layer capacitor coated with the conductive undercoating agent composition for a current collector for a battery or electrical double layer capacitor. The battery can be produced by a known method.

According to the present invention, the adhesion force between the battery current collector and the active material layer can be improved, so that deterioration of the battery characteristics due to peeling of the coating during the use can be prevented.

According to the present invention, the resistance between the current collector and the active material layer can be reduced, enabling high-rate charge/discharge.

According to the present invention, an electrochemically stable interface bonding state can be formed, and therefore, when the battery is charged and discharged in many cycles repeatedly for a long term, or the charged battery is allowed to stand at a high temperature, the deterioration of the battery characteristics due to electrolysis can be prevented.

The battery of the present invention is advantageous not only in that the internal resistance is low, but also in that peeling between the current collector and the active material layer is unlikely to occur, so that the battery can flow a large current, enabling quick charge/discharge. Further, the active material layer is strongly bonded to the surface of the battery current collector, and therefore the increase of the resistance due to the deterioration of the interface can be suppressed, and the lowering of the battery characteristics in a long-term reliability test, such as a charge/discharge test or a storage test, is small. Particularly, the inorganic particles having an active hydrogen group in the present invention and a polar substituent present on the surface of a battery current collector (for example, a hydroxy group on a metal) together form a hydrogen bond or a covalent bond, and hence excellent adhesion force and excellent electrochemical durability of the adhesion force can be obtained. A conventional conductive undercoating agent composition forms a bonding which is easily electrochemically cleaved because of the organic material contributing to the bonding, and therefore cannot produce a battery having satisfactorily excellent long-term reliability. By contrast, in the present invention, the bonding between the active hydrogen group on the surface of the inorganic particles and the polar substituent on the surface of the current collector metal is electrochemically stable, thus achieving excellent long-term stability. Further, the conductive agent contained in the coating agent interacts with the surface of the current collector to lower the resistance of the interface. For example, an insulating oxide film or hydroxide film is present on the surface of a metal current collector, and, when using conductive particles as the conductive agent, the conductive particles penetrate the insulating film, making it possible to reduce the resistance, and, when using an ionic liquid, the ionic liquid permeates through the defects of the insulating film, making it possible to reduce the resistance.

Further, the battery current collector coated with the conductive undercoating agent composition of the present invention is highly effective in reducing the internal resistance of a olivine ferrous (LiFePO$_4$) lithium-ion battery having a relatively high resistance, and can be especially preferably applied to such a battery.

EXAMPLES

Hereinbelow, the present invention will be described in more detail with reference to the following Examples, which should not be construed as limiting the scope of the present invention. The indication "part(s)" for the amount is given by weight unless otherwise specified.

Test Example 1

With respect to the lithium-ion secondary batteries produced in the below-described Examples and Comparative Examples, the following characteristics were measured.

(Measurement of Initial Capacity)

For obtaining an initial capacity, charging was conducted at a constant current of 0.01 mA until the voltage became 4.2 V, and then charging was conducted at a constant voltage of 4.2 V for 2 hours. Subsequently, discharging was conducted at a constant current of 0.01 mA until the voltage became 3 V. A series of the above operations was repeated three times, and the discharge capacity at the 3rd cycle was taken as an initial capacity.

(Initial Internal Resistance)

The potential of the cell obtained after measuring an initial capacity was increased to 4.2 V, and, as an initial internal resistance, an impedance at 1 kHz was measured with a voltage change of ±20 mV from the above potential as a center.

(Rate Characteristics)

Discharge rates were individually determined from the initial capacity, and a discharge capacity was measured for each of the discharge rates. In each charging operation, charging was conducted at a constant current over 10 hours until the voltage was increased to 4.2 V, and then charging was conducted at a constant voltage of 4.2 V for 2 hours. Subsequently, discharging was conducted at a constant current over 10 hours until the voltage became 3 V, and the discharge capacity obtained at that time was taken as a discharge capacity for 0.1 C. Next, the same charging operation was conducted and then, discharging was conducted at a current at which discharging was completed in one hour from the discharge capacity determined for 0.1 C, and the discharge capacity determined at that time was taken as a discharge capacity for 1 C.

Similarly, discharge capacities for 3 C, 10 C, and 30 C were individually determined, and, taking the discharge capacity for 0.1 C as 100%, a capacity maintaining ratio was determined by making a calculation.

(Cycle Life)

A charge/discharge test in which charging was conducted at 1 C until the voltage became 4.2 V and charging was conducted at a constant voltage of 4.2 V for 2 hours and then discharging was conducted at 1 C was performed. In this instance, a percentage of the discharge capacity to that in the first discharge was calculated, and the number of charge/discharge cycles at which the capacity was reduced to less than 80% was determined as a life.

(Float Test)

Charging was conducted at 0.1 C at 45° C. until the voltage became 4.2 V, and a change of the impedance at a constant voltage of 4.2 V was measured substantially on alternate days. A period of time until the resistance was increased two times was determined as a life.

(Peeling Test of the Electrode after Durability Test)

A battery was subjected to 1,000-cycle charge/discharge durability test under conditions for the above-mentioned cycle life, and, after the durability test, the resultant battery was disassembled to check whether or not the active material layer was removed from the positive electrode and negative electrode.

Evaluations were made in accordance with the following criteria.

⊚: No removal is observed.
○: A partial removal is observed, but the current collector is not exposed.
Δ: A removal proceeds, and part of the current collector is exposed.
X: The active material layer is completely removed.

Test Example 2

With respect to the electrical double layer capacitors produced in the below-described Examples and Comparative Examples, the following characteristics were measured.

(Measurement of Initial Capacity)

For obtaining an initial capacity, charging was conducted at a constant current of 0.01 mA until the voltage became 2.1 V. Subsequently, discharging was conducted at a constant current of 0.01 mA until the voltage became 0 V. A series of the above operations was repeated three times, and the discharge capacity at the 3rd cycle was taken as an initial capacity.

(Initial Internal Resistance)

The potential of the cell obtained after measuring an initial capacity was increased to 2.1 V, and, as an initial internal resistance, an impedance at 1 kHz was measured with a voltage change of ±10 mV from the above potential as a center.

(Rate Characteristics)

Discharge rates were individually determined from the initial capacity, and a discharge capacity was measured for each of the discharge rates. In each charging operation, charging was conducted at a constant current over one hour until the voltage was increased to 2.1 V. Subsequently, discharging was conducted at a constant current over one hour until the voltage became 0 V, and the discharge capacity obtained at that time was taken as a discharge capacity for 1 C. Next, the same charging operation was conducted and then, discharging was conducted at a current at which discharging was completed in 0.1 hour from the discharge capacity determined for 1 C, and the discharge capacity determined at that time was taken as a discharge capacity for 10 C. Similarly, discharge capacities for 30 C, 100 C, and 300 C were individually determined, and, taking the discharge capacity for 1 C as 100%, a capacity maintaining ratio was determined by making a calculation.

(Cycle Life)

A charge/discharge test in which charging was conducted at 1 C until the voltage became 2.1 V and then discharging was conducted at 1 C until the voltage became 0 V was performed. In this instance, a percentage of the discharge capacity to that in the first discharge was calculated, and the number of charge/discharge cycles at which the capacity was reduced to less than 80% was determined as a life.

(Float Test)

Charging was conducted at 1 C at 60° C. until the voltage became 2.9 V, and a change of the impedance at a constant voltage of 2.9 V was measured substantially on alternate days. A period of time until the resistance was increased two times was determined as a life.

(Peeling Test of the Electrode after Durability Test)

An electrical double layer capacitor was subjected to 3,000-hour float durability test under conditions for the above-mentioned float life, and, after the durability test, the resultant electrical double layer capacitor was disassembled to check whether or not the active material layer was removed from the electrode current collector.

Evaluations were made in accordance with the following criteria.

⊚: No removal is observed.
○: A partial removal is observed, but the current collector is not exposed.
Δ: A removal proceeds, and part of the current collector is exposed.
X: The active material layer is completely removed.

Examples 1 to 28

Application to a Lithium-Ion Secondary Battery

In Examples 1 to 28, a method is described in which a lithium-ion secondary battery is produced using a current collector having a positive electrode coated with the conductive undercoating agent composition comprising a polymer having a substituent capable of bonding to an active hydrogen group, inorganic particles having an active hydrogen group, and a conductive agent.

(Production of a Conductive Undercoating Agent Composition)

1,000 Parts of water was placed in a 10 L beaker, and, while stirring at 25° C., 20 parts of a polymer having a substituent capable of bonding to an active hydrogen group was added thereto and the resultant mixture was heated to 80° C. over 3 hours, and stirred at 80° C. for another 5 hours until the mixture became uniform. The mixture was cooled to 25° C., and then 10 parts of inorganic particles having an active hydrogen group were added thereto and the resultant mixture was stirred for 4 hours until the mixture became substantially uniform.

The resultant dispersion was dispersed using a bead mill equipped with a cooling jacket. 0.3 mm zirconia balls were placed in the dispersion at a packing of 80%, and the dispersion was continuously circulated at a circumferential speed of 15 m for 48 hours while cooling so that the temperature of the dispersion did not become 40° C. or higher, obtaining a dispersion.

To the resultant dispersion was added 25 parts of acetylene black (DENKA BLACK HS-100, manufactured by Denki Kagaku Kogyo Kabushiki Kaisha) as a conductive agent, and the resultant mixture was stirred until the mixture became substantially uniform to obtain a dispersion.

The obtained dispersion was further dispersed using a bead mill equipped with a cooling jacket. 0.5 mm zirconia balls were placed in the dispersion at a packing of 80%, and the dispersion was stirred by circulating twice at a circumferential speed of 7 m while cooling so that the temperature of the dispersion did not become 30° C. or higher, obtaining a coating composition which is a conductive undercoating agent composition. The materials for the respective Examples are shown in Table 1 below.

Carboxymethyl cellulose (H-CMC, manufactured by Daicel Chemical Industries, Ltd.)

Polyacrylamide (ACCOFLOC A-102, manufactured by MT AquaPolymer, Inc.)

Epoxy resin (EX-614, manufactured by Nagase ChemteX Corporation)

Polyethyleneimine (EPOMIN P-1000, manufactured by Nippon Shokubai Co., Ltd.; resin content: 30%)

Polyacrylate (ACCOFLOC C-502, manufactured by MT AquaPolymer, Inc.)

TABLE 1

| Example | Polymer compound | Inorganic particles | Additive |
|---|---|---|---|
| 1 | Partially saponified polyvinyl alcohol | Silica | None |
| 2 | Partially saponified polyvinyl alcohol | Boehmite | None |
| 3 | Partially saponified polyvinyl alcohol | Boehmite | None |
| 4 | Partially saponified polyvinyl alcohol | Synthetic smectite | None |
| 5 | Partially saponified polyvinyl alcohol | Mullite | None |
| 6 | Partially saponified polyvinyl alcohol | Titania | None |
| 7 | Partially saponified polyvinyl alcohol | Tin oxide | None |
| 8 | Partially saponified polyvinyl alcohol | γ-Alumina | None |
| 9 | Partially saponified polyvinyl alcohol | α-Alumina | None |
| 10 | Partially saponified polyvinyl alcohol | Magnesium hydroxide | None |
| 11 | Modified polyvinyl alcohol 1 | Boehmite | None |
| 12 | Modified polyvinyl alcohol 2 | Boehmite | None |
| 13 | Carboxymethyl cellulose | Boehmite | None |
| 14 | Polyacrylamide | Boehmite | None |
| 15 | Epoxy resin | Boehmite | None |
| 16 | Polyethyleneimine | Boehmite | None |
| 17 | Polyacrylate | Boehmite | None |
| 18 | Chitosan | Boehmite | None |
| 19 | Starch | Boehmite | None |
| 20 | Polystyrenesulfonic acid | Boehmite | None |
| 21 | Partially saponified polyvinyl alcohol | Boehmite | Titanium coupling agent |
| 22 | Modified polyvinyl alcohol 1 | Boehmite | Titanium coupling agent |
| 23 | Modified polyvinyl alcohol 1 | Boehmite | Titanium coupling agent |
| 24 | Modified polyvinyl alcohol 1 | Boehmite | Titanium coupling agent |
| 25 | Modified polyvinyl alcohol 1 | Boehmite | Pyromellitic acid |
| 26 | Partially saponified polyvinyl alcohol | Boehmite | Silane coupling agent |
| 27 | Partially saponified polyvinyl alcohol | Silica | Titanium coupling agent |
| 28 | Partially saponified polyvinyl alcohol | Silica | Silane coupling agent |

The materials used in Examples shown in Table 1 are as follows.

Silica (NanoTek $SiO_2$, manufactured by C. I. Kasei Co., Ltd.; pH for isoelectric point: 1.8)

Boehmite (C01, manufactured by Taimei Chemicals Co., Ltd.; pH for isoelectric point: 7.5)

Synthetic smectite (Lucentite SWN, manufactured by Co-op Chemical Co., Ltd.; pH for isoelectric point: 10.5)

Mullite (KM101, manufactured by KCM Corporation; pH for isoelectric point: 5.8)

Titania (PW-1010, manufactured by JGC C & C; pH for isoelectric point: 6.1, 10%)

Tin oxide (NanoTek $SnO_2$, manufactured by C. I. Kasei Co., Ltd.; pH for isoelectric point: 6.9)

γ-Alumina (TAIMICRON TM-300, manufactured by Taimei Chemicals Co., Ltd.; pH for isoelectric point: 7.9)

α-Alumina (TAIMICRON TM-D, manufactured by Taimei Chemicals Co., Ltd.; pH for isoelectric point: 9.1)

Magnesium hydroxide (ECOMAG PZ-1, manufactured by Tateho Chemical Industries Co., Ltd.; pH for isoelectric point: 12.4)

Partially saponified polyvinyl alcohol (KURARAY POVAL PVA-235, manufactured by Kuraray Co., Ltd.)

Modified polyvinyl alcohol 1 (KURARAY POVAL R1130, silyl group-modified polyvinyl alcohol, manufactured by Kuraray Co., Ltd.)

Modified polyvinyl alcohol 2 (Cyanoresin CR-S, manufactured by Shin-Etsu Chemical Co., Ltd.)

Chitosan (Chitosan 5, manufactured by Wako Pure Chemical Industries, Ltd.)

Starch (Esterified Starch Amycol, manufactured by Nippon Starch Chemical Co., Ltd.)

Polystyrenesulfonic acid (Poly-NaSS PS-100, manufactured by Tosoh Organic Chemical Co., Ltd.)

Titanium coupling agent (Orgatix TC-400, manufactured by Matsumoto Trading Co., Ltd.)

Silane coupling agent (KBM-403, manufactured by Shin-Etsu Chemical Co., Ltd.)

In Example 12, instead of 1,000 parts of water, a mixture of 1,000 parts of water and 500 parts of N-methylpyrrolidone was used.

In Example 16, the amount of the polymer added was changed from 20 parts to 66 parts.

In Examples 21 and 22, before adding the inorganic particles having an active hydrogen group, 0.5 part of a titanium coupling agent was added, and the resultant mixture was uniformly stirred at 25° C. by means of a propeller mixer, and then the inorganic particles were added. This amount is such that the titanium coupling agent is reacted with 25% of the active hydrogen groups present on the surface of the boehmite added. After adding the titanium coupling agent, the pH for isoelectric point was 7.2.

In Example 23, before adding the inorganic particles having an active hydrogen group, 1 part of a titanium coupling agent was added, and the resultant mixture was uniformly stirred at 25° C. by means of a propeller mixer, and then the inorganic particles were added. This amount is such that the titanium coupling agent is reacted with 50% of the active hydrogen groups present on the surface of the boehmite added. After adding the titanium coupling agent, the pH for isoelectric point was 7.1.

In Example 24, before adding the inorganic particles having an active hydrogen group, 2 parts of a titanium coupling agent was added, and the resultant mixture was uniformly stirred at 25° C. by means of a propeller mixer, and then the inorganic particles were added. This amount is such that the titanium coupling agent is reacted with all the active hydrogen groups present on the surface of the boehmite added. After adding the titanium coupling agent, the pH for isoelectric point was 7.1.

In Example 25, 2 parts of pyromellitic acid was added simultaneously with the polymer.

In Example 26, before adding the inorganic particles having an active hydrogen group, 0.8 part of a silane coupling agent was added, and the resultant mixture was uniformly stirred at 25° C. by means of a propeller mixer, and then the inorganic particles were added. This amount is such that the silane coupling agent is reacted with 25% of the active hydrogen groups present on the surface of the boehmite added. After adding the silane coupling agent, the pH for isoelectric point was 6.0.

In Example 27, before adding the inorganic particles having an active hydrogen group, 0.3 part of a titanium coupling agent was added, and the resultant mixture was uniformly stirred at 25° C. by means of a propeller mixer, and then the inorganic particles were added. This amount is such that the titanium coupling agent is reacted with 25% of the active hydrogen groups present on the surface of the silica added. After adding the titanium coupling agent, the pH for isoelectric point was 5.9.

In Example 28, before adding the inorganic particles having an active hydrogen group, 0.8 part of a silane coupling agent was added, and the resultant mixture was uniformly stirred at 25° C. by means of a propeller mixer, and then the inorganic particles were added. This amount is such that the silane coupling agent is reacted with 25% of the active hydrogen groups present on the surface of the silica added. After adding the silane coupling agent, the pH for isoelectric point was 5.5.

(Production of a Positive Electrode)

In a 10 L planetary mixer equipped with a cooling jacket were placed 600 parts of a 15% NMP solution of PVdF (Kureha KF Polymer #1120, manufactured by Kureha Corporation), 1,100 parts of lithium cobalt oxide (C-5H, manufactured by Nippon Chemical Industrial Co., Ltd.), 100 parts of acetylene black (DENKA BLACK HS-100, manufactured by Denki Kagaku Kogyo Kabushiki Kaisha), and 5,000 parts of NMP, and the resultant mixture was stirred while cooling so that the temperature of the mixture did not exceed 30° C. until the mixture became uniform. The resultant active material was applied to the above-obtained current collector having a conductive coating layer formed thereon so that the applied material had a width of 180 mm and a thickness of 200 µm, and dried in a hot-air oven at 160° C. for 20 seconds. The resultant current collector was roll-pressed at a linear pressure of 400 kgf/cm. The positive electrode active material layer formed after pressed had a thickness of 22 µm.

(Production of a Negative Electrode)

In a 10 L planetary mixer equipped with a cooling jacket were placed 600 parts of a 15% NMP solution of PVdF (Kureha KF Polymer #9130, manufactured by Kureha Corporation), 1,150 parts of graphite (GR-15, manufactured by Nippon Graphite Industries, Ltd.), and 4,000 parts of NMP, and the resultant mixture was stirred while cooling so that the temperature of the mixture did not exceed 30° C. until the mixture became uniform. The resultant active material was applied to the above-obtained current collector having a conductive coating layer formed thereon (uncoated copper foil except for Example 3) so that the applied material had a width of 180 mm and a thickness of 200 µm, and dried in a hot-air oven at 120° C. for 2 minutes. The resultant current collector was roll-pressed at a linear pressure of 300 kgf/cm. The negative electrode active material layer formed after pressed had a thickness of 28 µm.

(Production of a Lithium-Ion Secondary Battery)

Each of the positive electrode and negative electrode was cut into 40 mm×50 mm so that a 10 mm width region having no active material layer in both ends was included at the short side, and an aluminum tab and a nickel tab were welded by resistance welding to the metal exposed portions of the positive electrode and the negative electrode, respectively. A separator (#2400, manufactured by Celgard Co., Ltd.) was cut into a size having a width of 45 mm and a length of 120 mm, and folded in three and the positive electrode and the negative electrode were disposed between the folded separator so that the positive electrode and negative electrode faced to each other, and the resultant material was disposed between an aluminum laminate cell folded in half having a width of 50 mm and a length of 100 mm, and a sealant was placed between the portions with which the tabs for the individual electrodes were in contact, and then the sealant portion and the sides perpendicular to the sealant portion were subjected to heat lamination to obtain the cell in a bag form. The resultant cell was subjected to vacuum drying in a vacuum oven at 100° C. for 12 hours, and then vacuum-impregnated with a 1 M electrolytic solution comprising lithium hexafluorophosphate/EC:DEC=1:1 (LBG-96533, manufactured by Kishida Chemical Co., Ltd.) in a dry glove box, and then the excess electrolytic solution was withdrawn, followed by sealing using a vacuum sealer, to produce a lithium-ion battery.

Examples 29 to 56

Application to an Electrical Double Layer Capacitor

In Examples 29 to 56, a method in which an electrical double layer capacitor is produced using a current collector coated with the conductive undercoating agent composition is described.

(Conductive Undercoating Agent Composition)

The conductive undercoating agent composition was prepared by the same method as in Examples 1 to 28, and electrical double layer capacitors in Examples 29 to 56 were produced using the formulations and production conditions corresponding to Examples 1 to 28, respectively, and they were evaluated in respect of the performance.

(Production of a Current Collector Having a Conductive Coating Layer Formed Thereon)

The coating compositions produced in Examples 1 to 28 were individually applied to a rolled aluminum foil having a width of 300 mm and a thickness of 20 µm so that the applied composition had a width of 200 mm and a thickness of 10 µm, and dried in a hot-air oven at 180° C. for 30 seconds. The dried coating film had a thickness of 1 µm. The conductive undercoating agent composition was applied to both the positive and the negative electrodes, but, only in Example 31, the composition was applied only to the positive electrode.

(Production of an Electrode)

In a 10 L planetary mixer equipped with a cooling jacket were placed 3,000 parts of a 15% NMP solution of PVdF (Kureha KF Polymer #1120, manufactured by Kureha Corporation), 1,500 parts of activated carbon (Kuraraycoal RP-20, manufactured by Kuraray Chemical Co., Ltd.), and 2,500 parts of NMP, and the resultant mixture was stirred while cooling so that the temperature of the mixture did not exceed 30° C. until the mixture became uniform. The resultant active material was applied to the above-obtained current collector having a conductive coating layer formed thereon so that the applied material had a width of 180 mm and a thickness of 200 μm, and dried in a hot-air oven at 160° C. for 20 seconds. The resultant current collector was roll-pressed at a linear pressure of 400 kgf/cm. The electrode active material layer formed after pressed had a thickness of 22 μm. With respect to the negative electrode in Example 31, using an aluminum foil which is not coated with the conductive undercoating agent composition, an electrode was prepared by the above-mentioned procedure.

(Production of an Electrical Double Layer Capacitor)

The electrode was cut into 40 mm×50 mm so that a 10 mm region having no active material layer was included at the short side, and an aluminum tab was welded to the metal exposed portion by resistance welding. A separator (#2400, manufactured by Celgard Co., Ltd.) was cut into a size having a width of 45 mm and a length of 120 mm, and folded in three and the two electrodes were disposed between the folded separator so that the electrodes faced to each other, and the resultant material was disposed between an aluminum laminate cell folded in half having a width of 50 mm and a length of 100 mm, and a sealant was placed between the portions with which the tabs for the individual electrodes were in contact, and then the sealant portion and the sides perpendicular to the sealant portion were subjected to heat lamination to obtain the cell in a bag form. The resultant cell was subjected to vacuum drying in a vacuum oven at 100° C. for 12 hours, and then vacuum-impregnated with a 1 M electrolytic solution comprising tetraethylammonium borofluoride/PC (CPG-00005, manufactured by Kishida Chemical Co., Ltd.) in a dry glove box, and then the excess electrolytic solution was withdrawn, followed by sealing using a vacuum sealer, to produce an electrical double layer capacitor.

Comparative Example 1

A lithium-ion secondary battery was produced by substantially the same method as in Example 1 except that a battery current collector which is not coated with the conductive undercoating agent composition was used.

Comparative Example 2

In Comparative Example 2, a method is described in which a lithium-ion secondary battery is produced using a current collector having both the positive electrode and the negative electrode coated with a conductive undercoating agent composition comprising a partially saponified polyvinyl alcohol and a conductive agent.

(Production of a Conductive Undercoating Agent Composition)

1,100 Parts of water and 30 parts of a partially saponified polyvinyl alcohol (KURARAY POVAL PVA 235, manufactured by Kuraray Co., Ltd.) were placed in a 10 L beaker and stirred at 80° C. for 6 hours until the resultant mixture became uniform. Parts of acetylene black (DENKA BLACK HS-100, manufactured by Denki Kagaku Kogyo Kabushiki Kaisha) was added thereto and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive undercoating agent composition.

(Method for Producing a Lithium-Ion Secondary Battery)

A lithium-ion secondary battery was produced by substantially the same method as in Example 1 except that current collectors of both the positive electrode and the negative electrode were coated with the above-obtained conductive undercoating agent composition.

Comparative Example 3

In Comparative Example 3, a method is described in which a lithium-ion secondary battery is produced using a current collector having the positive electrode coated with a conductive undercoating agent composition comprising a partially saponified polyvinyl alcohol, a polycarboxylic acid, and a conductive agent.

(Production of a Conductive Undercoating Agent Composition)

1,000 Parts of water and 20 parts of a partially saponified polyvinyl alcohol (KURARAY POVAL PVA 235, manufactured by Kuraray Co., Ltd.) were placed in a 10 L beaker and stirred at 80° C. for 6 hours until the resultant mixture became uniform. 10 Parts of pyromellitic acid was added thereto and the resultant mixture was stirred at 60° C. for 4 hours until the mixture became uniform. 25 Parts of acetylene black (DENKA BLACK HS-100, manufactured by Denki Kagaku Kogyo Kabushiki Kaisha) was added and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive undercoating agent composition.

(Method for Producing a Lithium-Ion Secondary Battery)

A lithium-ion secondary battery was produced by substantially the same method as in Example 1 except that a current collector of the positive electrode was coated with the above-obtained conductive undercoating agent composition.

Comparative Example 4

In Comparative Example 4, a method is described in which a lithium-ion secondary battery is produced using a current collector having both the positive electrode and negative electrode coated with a conductive undercoating agent composition comprising a partially saponified polyvinyl alcohol, a polycarboxylic acid, a conductive agent, and a titanium coupling agent.

(Production of a Conductive Undercoating Agent Composition)

1,000 Parts of water and 20 parts of a partially saponified polyvinyl alcohol (KURARAY POVAL PVA 235, manufactured by Kuraray Co., Ltd.) were placed in a 10 L beaker and stirred at 80° C. for 6 hours until the resultant mixture became uniform. 10 Parts of pyromellitic acid was added thereto and the resultant mixture was stirred at 60° C. for 4 hours until the mixture became uniform. 25 Parts of acetylene black (DENKA BLACK HS-100, manufactured by Denki Kagaku Kogyo Kabushiki Kaisha) was added and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher. 1 Part of a titanium coupling agent (Orgatix TC-400, manufactured by Matsumoto Trading Co., Ltd.) was added to the dispersion and stirred at room temperature until the resultant mixture became uniform, obtaining a coating composition which is a conductive undercoating agent composition.

(Method for Producing a Lithium-Ion Secondary Battery)

A lithium-ion secondary battery was produced by substantially the same method as in Example 1 except that current collectors of both the positive electrode and the negative electrode were coated with the above-obtained conductive undercoating agent composition.

Comparative Example 5

In Comparative Example 5, a method is described in which an electrical double layer capacitor is produced using a current collector which is not coated with the conductive undercoating agent composition.

(Method for Producing an Electrical Double Layer Capacitor)

An electrical double layer capacitor was produced by substantially the same method as in Example 29 except that a current collector which is not coated with the conductive undercoating agent composition was used.

Comparative Example 6

In Comparative Example 6, a method is described in which an electrical double layer capacitor is produced using a current collector having both the positive electrode and the negative electrode coated with the conductive coating agent produced in Comparative Example 2.

(Method for Producing an Electrical Double Layer Capacitor)

An electrical double layer capacitor was produced by substantially the same method as in Example 29 except that a current collector having both the positive electrode and negative electrode coated with the conductive undercoating agent composition produced in Comparative Example 2 was used.

Comparative Example 7

In Comparative Example 7, a method is described in which an electrical double layer capacitor is produced using a current collector having both the positive electrode and the negative electrode coated with the conductive coating agent produced in Comparative Example 3.

(Method for Producing an Electrical Double Layer Capacitor)

An electrical double layer capacitor was produced by substantially the same method as in Example 29 except that a current collector having both the positive electrode and negative electrode coated with the conductive undercoating agent composition produced in Comparative Example 3 was used.

Comparative Example 8

In Comparative Example 8, a method is described in which an electrical double layer capacitor is produced using a current collector having both the positive electrode and negative electrode coated with the conductive coating agent produced in Comparative Example 4.

(Method for Producing an Electrical Double Layer Capacitor)

An electrical double layer capacitor was produced by substantially the same method as in Example 29 except that a current collector having both the positive electrode and the negative electrode coated with the conductive undercoating agent composition produced in Comparative Example 4 was used.

Comparative Example 9

In Comparative Example 9, a method in which an electrical double layer capacitor is produced using an etched foil is described.

(Method for Producing an Electrical Double Layer Capacitor)

An electrical double layer capacitor was produced by substantially the same method as in Example 29 except that an uncoated aluminum etched foil (width: 300 mm; thickness: 20 μm) for electrical double layer capacitor was used as a current collector.

[Evaluation of the Characteristics of Lithium-Ion Secondary Battery]

The characteristics of the lithium-ion secondary batteries in Examples 1 to 28 and Comparative Examples 1 to 4 were evaluated in accordance with the methods described above in Test Example 1. The results are shown in Table 2.

[Evaluation of the Characteristics of Electrical Double Layer Capacitor]

The characteristics of the electrical double layer capacitors in Examples 29 to 56 and Comparative Examples 5 to 9 were evaluated in accordance with the methods described above in Test Example 2. The results are shown in Table 3.

TABLE 2

| | Evaluation with respect to lithium-ion secondary battery | | | | | | | | | |
|---|---|---|---|---|---|---|---|---|---|---|
| Example/ Comparative Example | Initial capacity (mAh) | Initial internal resistance (Ω) | Rate characteristics:Capacity maintaining ratio (%) | | | | | | Cycle life (Cycle) | Float life (Hour) | Peeling |
| | | | 1 C | 3 C | 10 C | 30 C | 100 C | 300 C | | | |
| Example 1 | 9 | 3.2 | 99 | 92 | 72 | 37 | — | — | 610 | 1200 | ◎ |
| Example 2 | 10 | 3.0 | 99 | 94 | 79 | 46 | — | — | 820 | 1700 | ◎ |
| Example 3 | 10 | 2.7 | 99 | 94 | 81 | 48 | — | — | 840 | 1750 | ◎ |
| Example 4 | 9 | 3.1 | 99 | 93 | 73 | 41 | — | — | 770 | 1550 | ◎ |

TABLE 2-continued

Evaluation with respect to lithium-ion secondary battery

| Example/ Comparative Example | Initial capacity (mAh) | Initial internal resistance (Ω) | Rate characteristics:Capacity maintaining ratio (%) | | | | | | Cycle life (Cycle) | Float life (Hour) | Peeling |
|---|---|---|---|---|---|---|---|---|---|---|---|
| | | | 1 C | 3 C | 10 C | 30 C | 100 C | 300 C | | | |
| Example 5 | 9 | 3.1 | 99 | 93 | 74 | 39 | — | — | 760 | 1450 | ⊚ |
| Example 6 | 9 | 3.1 | 99 | 93 | 77 | 42 | — | — | 780 | 1600 | ⊚ |
| Example 7 | 9 | 3.1 | 99 | 92 | 75 | 40 | — | — | 750 | 1400 | ⊚ |
| Example 8 | 10 | 3.0 | 99 | 94 | 79 | 49 | — | — | 830 | 1800 | ⊚ |
| Example 9 | 10 | 2.9 | 99 | 96 | 83 | 53 | — | — | 960 | 2100 | ⊚ |
| Example 10 | 9 | 3.1 | 99 | 92 | 73 | 42 | — | — | 750 | 1500 | ⊚ |
| Example 11 | 12 | 2.4 | 99 | 98 | 86 | 63 | — | — | 1200 | 3700 | ⊚ |
| Example 12 | 9 | 3.2 | 98 | 91 | 69 | 33 | — | — | 590 | 800 | ○ |
| Example 13 | 10 | 3.1 | 99 | 93 | 77 | 44 | — | — | 810 | 1650 | ⊚ |
| Example 14 | 11 | 2.8 | 99 | 97 | 83 | 59 | — | — | 1050 | 2500 | ⊚ |
| Example 15 | 9 | 3.2 | 99 | 92 | 71 | 38 | — | — | 660 | 1400 | ⊚ |
| Example 16 | 9 | 3.2 | 99 | 94 | 73 | 41 | — | — | 730 | 1600 | ⊚ |
| Example 17 | 10 | 2.9 | 99 | 94 | 75 | 44 | — | — | 870 | 1850 | ⊚ |
| Example 18 | 9 | 3.0 | 99 | 93 | 77 | 50 | — | — | 840 | 1700 | ⊚ |
| Example 19 | 9 | 3.1 | 99 | 94 | 74 | 43 | — | — | 790 | 1750 | ⊚ |
| Example 20 | 9 | 3.1 | 99 | 93 | 79 | 46 | — | — | 810 | 1650 | ⊚ |
| Example 21 | 10 | 3.0 | 99 | 95 | 79 | 48 | — | — | 960 | 1850 | ⊚ |
| Example 22 | 12 | 2.3 | 99 | 98 | 88 | 69 | — | — | 1600 | 4100 | ⊚ |
| Example 23 | 12 | 2.4 | 99 | 97 | 86 | 66 | — | — | 1500 | 3900 | ⊚ |
| Example 24 | 9 | 3.1 | 99 | 92 | 73 | 37 | — | — | 610 | 850 | ○ |
| Example 25 | 12 | 2.4 | 99 | 97 | 87 | 64 | — | — | 1300 | 3750 | ⊚ |
| Example 26 | 10 | 3.1 | 99 | 94 | 77 | 46 | — | — | 940 | 1750 | ⊚ |
| Example 27 | 9 | 3.2 | 99 | 93 | 74 | 40 | — | — | 650 | 1300 | ⊚ |
| Example 28 | 10 | 3.0 | 99 | 95 | 79 | 50 | — | — | 950 | 1800 | ⊚ |
| Comparative Example 1 | 6 | 4.5 | 95 | 74 | 45 | 0 | — | — | 81 | 45 | X |
| Comparative Example 2 | 7 | 4.1 | 97 | 79 | 50 | 12 | — | — | 110 | 81 | X |
| Comparative Example 3 | 9 | 3.6 | 98 | 86 | 59 | 27 | — | — | 410 | 650 | Δ |
| Comparative Example 4 | 8 | 3.8 | 98 | 82 | 53 | 25 | — | — | 300 | 350 | X |

TABLE 3

Evaluation with respect to electrical double layer capacitor

| Example/ Comparative Example | Initial capacity (mAh) | Initial internal resistance (Ω) | Rate characteristics:Capacity maintaining ratio (%) | | | | | | Cycle life (Cycle) | Float life (Hour) | Peeling |
|---|---|---|---|---|---|---|---|---|---|---|---|
| | | | 1 C | 3 C | 10 C | 30 C | 100 C | 300 C | | | |
| Example 29 | 1.5 | 1.7 | — | — | 99 | 97 | 92 | 89 | 4000 | 2800 | ⊚ |
| Example 30 | 1.6 | 1.5 | — | — | 99 | 97 | 93 | 91 | 5300 | 4000 | ⊚ |
| Example 31 | 1.6 | 1.3 | — | — | 99 | 97 | 93 | 91 | 5400 | 3900 | ⊚ |
| Example 32 | 1.5 | 1.6 | — | — | 99 | 97 | 92 | 89 | 5000 | 3200 | ⊚ |
| Example 33 | 1.5 | 1.6 | — | — | 99 | 97 | 92 | 87 | 4900 | 3400 | ⊚ |
| Example 34 | 1.5 | 1.6 | — | — | 99 | 97 | 92 | 89 | 5100 | 3700 | ⊚ |
| Example 35 | 1.5 | 1.6 | — | — | 99 | 97 | 92 | 89 | 4850 | 3100 | ⊚ |
| Example 36 | 1.6 | 1.5 | — | — | 99 | 98 | 93 | 91 | 5400 | 4200 | ⊚ |
| Example 37 | 1.6 | 1.4 | — | — | 99 | 98 | 94 | 91 | 6250 | 4700 | ⊚ |
| Example 38 | 1.5 | 1.6 | — | — | 99 | 97 | 92 | 88 | 4900 | 3600 | ⊚ |
| Example 39 | 2 | 1.2 | — | — | 99 | 98 | 94 | 91 | 8000 | 8200 | ⊚ |
| Example 40 | 1.5 | 1.6 | — | — | 99 | 97 | 91 | 86 | 4000 | 1900 | ○ |
| Example 41 | 1.6 | 1.6 | — | — | 99 | 97 | 93 | 90 | 5100 | 3650 | ⊚ |
| Example 42 | 1.8 | 1.4 | — | — | 99 | 98 | 94 | 90 | 7000 | 5500 | ⊚ |
| Example 43 | 1.5 | 1.7 | — | — | 99 | 97 | 92 | 89 | 4350 | 3350 | ⊚ |
| Example 44 | 1.5 | 1.7 | — | — | 99 | 97 | 92 | 88 | 4900 | 3600 | ⊚ |
| Example 45 | 1.6 | 1.4 | — | — | 99 | 97 | 92 | 89 | 5700 | 4150 | ⊚ |
| Example 46 | 1.5 | 1.5 | — | — | 99 | 97 | 93 | 90 | 5500 | 4050 | ⊚ |
| Example 47 | 1.5 | 1.6 | — | — | 99 | 97 | 93 | 88 | 5200 | 4100 | ⊚ |
| Example 48 | 1.5 | 1.6 | — | — | 99 | 97 | 94 | 91 | 5250 | 3750 | ⊚ |
| Example 49 | 1.6 | 1.5 | — | — | 99 | 98 | 95 | 92 | 6300 | 4300 | ⊚ |
| Example 50 | 2 | 1.1 | — | — | 99 | 98 | 95 | 91 | 12000 | 9250 | ⊚ |
| Example 51 | 2 | 1.2 | — | — | 99 | 98 | 95 | 93 | 9500 | 9000 | ⊚ |
| Example 52 | 1.5 | 1.6 | — | — | 99 | 98 | 92 | 88 | 4000 | 2100 | ○ |
| Example 53 | 2 | 1.2 | — | — | 99 | 98 | 94 | 90 | 8500 | 8750 | ⊚ |

TABLE 3-continued

Evaluation with respect to electrical double layer capacitor

| Example/Comparative Example | Initial capacity (mAh) | Initial internal resistance (Ω) | Rate characteristics:Capacity maintaining ratio (%) | | | | | | Cycle life (Cycle) | Float life (Hour) | Peeling |
|---|---|---|---|---|---|---|---|---|---|---|---|
| | | | 1 C | 3 C | 10 C | 30 C | 100 C | 300 C | | | |
| Example 54 | 1.6 | 1.6 | — | — | 99 | 97 | 92 | 88 | 6200 | 3950 | ⊚ |
| Example 55 | 1.5 | 1.8 | — | — | 99 | 97 | 92 | 87 | 4250 | 3100 | ⊚ |
| Example 56 | 1.6 | 1.5 | — | — | 99 | 98 | 92 | 88 | 6100 | 4250 | ⊚ |
| Comparative Example 5 | 1.2 | 3.8 | — | — | 99 | 94 | 87 | 82 | 1850 | 120 | X |
| Comparative Example 6 | 1.2 | 3.2 | — | — | 99 | 96 | 89 | 85 | 2100 | 1200 | X |
| Comparative Example 7 | 1.5 | 2.1 | — | — | 99 | 97 | 90 | 84 | 3500 | 1600 | Δ |
| Comparative Example 8 | 1.4 | 2.5 | — | — | 99 | 97 | 89 | 84 | 3100 | 1400 | X |
| Comparative Example 9 | 1.4 | 2.8 | — | — | 99 | 96 | 88 | 83 | 3300 | 1200 | Δ |

INDUSTRIAL APPLICABILITY

The conductive undercoating agent composition for a current collector for a battery or electrical double layer capacitor of the present invention exhibits high adhesion force to a current collector for a battery or electrical double layer capacitor and more excellent electrochemical durability than that of a conventional composition, and therefore can provide a battery or an electrical double layer capacitor having excellent long-term reliability.

DESCRIPTION OF THE REFERENCE NUMERALS

1: Active material layer
2: Coating layer of the conductive undercoating agent composition for a battery electrode
3: Battery current collector

The invention claimed is:

1. A conductive undercoating agent composition for a current collector for a battery or electrical double layer capacitor, the composition comprising a polymer having a silyl group as a substituent capable of bonding to an active hydrogen group, inorganic particles having an active hydrogen group, and a conductive agent.

2. The undercoating agent composition according to claim 1, wherein the inorganic particles have a pH for isoelectric point in the range of from 4.5 to 14.

3. The undercoating agent composition according to claim 1, further comprising a titanium coupling agent and/or a silane coupling agent.

4. The undercoating agent composition according to claim 3, wherein the amount of the titanium coupling agent and/or silane coupling agent added is less than an amount such that the coupling agent is reacted with all the active hydrogen groups of the inorganic particles.

5. The undercoating agent composition according to claim 3, wherein the inorganic particles are silica, and the amount of the titanium coupling agent and/or silane coupling agent added is an amount such that the pH for isoelectric point of the silica falls in the range of from 4.5 to 14.

6. A current collector for a battery or electrical double layer capacitor which is coated with the undercoating agent composition according to claim 1.

7. A battery or electrical double layer capacitor comprising the battery or electrical double layer capacitor current collector according to claim 6.

8. The undercoating agent composition according to claim 2, further comprising a titanium coupling agent and/or silane coupling agent.

9. The undercoating agent composition according to claim 8, wherein the amount of the titanium coupling agent and/or silane coupling agent added is less than an amount such that the coupling agent is reacted with all the active hydrogen groups of the inorganic particles.

10. The undercoating agent composition according to claim 8, wherein the inorganic particles are silica, and the amount of the titanium coupling agent and/or silane coupling agent added is an amount such that the pH for isoelectric point of the silica falls in the range of from 4.5 to 14.

11. The undercoating agent composition according to claim 9, wherein the inorganic particles are silica, and the amount of the titanium coupling agent and/or silane coupling agent added is an amount such that the pH for isoelectric point of the silica falls in the range of from 4.5 to 14.

* * * * *